US008188183B2

(12) United States Patent  
Sarkar et al.

(10) Patent No.: US 8,188,183 B2  
(45) Date of Patent: May 29, 2012

(54) LOW VOC COATINGS AND PAINTS

(75) Inventors: Manish Sarkar, Bucks (GB); Barry Osborn, Herts (GB); Thomas Charreton, Surbiton (GB); Helen Silgram, Slough (GB)

(73) Assignee: Imperial Chemical Industries, PLC, London (GB)

( * ) Notice: Subject to any disclaimer, the term of this patent is extended or adjusted under 35 U.S.C. 154(b) by 71 days.

(21) Appl. No.: 11/573,123

(22) PCT Filed: Jul. 26, 2005

(86) PCT No.: PCT/EP2005/008191  
§ 371 (c)(1),  
(2), (4) Date: Jul. 20, 2007

(87) PCT Pub. No.: WO2006/013061  
PCT Pub. Date: Feb. 9, 2006

(65) Prior Publication Data  
US 2008/0269411 A1 Oct. 30, 2008

(30) Foreign Application Priority Data

Aug. 3, 2004 (GB) .................................. 0417278.9  
Sep. 22, 2004 (GB) .................................. 0421067.0

(51) Int. Cl.  
*C08F 2/44* (2006.01)  
*C08F 2/32* (2006.01)

(52) U.S. Cl. .................. 524/853; 524/878; 524/879
(58) Field of Classification Search .............. 524/853, 524/878, 879  
See application file for complete search history.

(56) References Cited

U.S. PATENT DOCUMENTS

| 3,966,667 A | * | 6/1976 | Sullivan et al. ............. 524/474 |
| 6,177,510 B1 | * | 1/2001 | Saam .......................... 524/773 |
| 2003/0045609 A1 | * | 3/2003 | Thames et al. ............. 523/161 |

OTHER PUBLICATIONS

RD 450083, publication date Oct. 10, 2001, Derwent ACC# 2006-81110, Author Anonymous.*

* cited by examiner

*Primary Examiner* — James J Seidleck  
*Assistant Examiner* — Deve E Valdez  
(74) *Attorney, Agent, or Firm* — George W. Moxon, II; Brian P. Harrod

(57) ABSTRACT

Coating compositions are provided which may be applied from aqueous systems and contain binders which are autoxidisable to produce rapid drying hard coatings, preferred binders are based on polymers derived from monomers obtained by the reaction of drying oil fatty acids and unsaturated monomers. The polymers contain microgels, have low Tg and contain residual unsaturation; preferred copolymers also contain amide groups. The drying of the coating compositions can be accelerated by the use of metal dryers and have been found to enable the use of particularly low levels of vanadium dryers.

24 Claims, No Drawings

LOW VOC COATINGS AND PAINTS

CROSS-REFERENCE TO RELATED APPLICATION

This application is the national phase under 35 U.S.C §371 of PCT International Application No. PCT/EP/2005/008191 having an international filing date of Jul. 26, 2005 entitled "LOW VOC COATINGS AND PAINTS", which designated the United States of America, and was published in the English language as international Publication No. WO 2006/013061, which claims the benefit of priority to Great British Patent Applications No. 0417278.9, filed Aug. 3, 2004 and No. 0421067.0 filed Sep. 22, 2004. The disclosures of all of these applications are hereby incorporated in their entirety by reference.

The present invention relates to coating compositions which have low emissions and in particular paints with low solvent emissions. The invention is particularly concerned with aqueous based coating compositions especially aqueous based paints although it is equally applicable to transparent coatings such as varnishes and to certain adhesive compositions. The invention further relates to polymers which may be used as binder in such coatings.

Coating compositions, including paints typically comprise a liquid carrier medium and a film forming binder polymer together with other components such as additives including thickeners and for coloured paints, of course, pigments. The liquid carrier can comprise water or organic solvent or indeed a mixture of the two. The binder polymer may be in the form of a dispersion in the carrier liquid, whereby the polymer exists in particulate form or it may be dissolved in the carrier liquid and be a solution.

Aqueous or waterborne paints, by which is meant paints in which the carrier liquid comprises more than 50 wt % water (the remainder being organic liquid), are usually formulated using binder polymers in dispersion, also known as latices. Such paints are often referred to as emulsion paints. Examples of such paints include the matt and silk emulsions. In contrast, solvent borne paints are normally formulated using polymers dissolved in organic liquid. Examples of such paint include gloss paints.

A more detailed description of binder polymer types is given later in this specification.

Coating compositions must satisfy certain requirements. For example three important requirements are that they can be readily applied to produce uniform coatings of the desired thickness and that once applied the coatings dry rapidly and harden to produce the required finish.

Paints and coating compositions are typically applied at ambient temperature which, depending upon local conditions, can range from about 3° C. to about 40° C. It is important that the coatings dry and harden to form a hard layer and that they do so as quickly as possible. For example where panels and doors are being manufactured it is disadvantageous if, after they have been painted or coated they must stand for extended periods of time to allow the paint or coating to dry and harden before they can be stacked and/or transported. It is equally important when painting in the domestic environment for the paint to harden rapidly as this minimises damage to the paint resulting from accidental contact by the occupants.

Usually, in order to form good continuous films when using waterborne emulsion paints formulated using latices it is important that the film forming binder polymer has a low Fox glass transition temperature, (also known as Tg) which is at or below ambient temperature at which the coating or paint is applied. This usually ensures that the minimum temperature at which the binder forms a film (also known as the MFFT) is also below this temperature. However, in order to produce a hard, non-tacky coating, the binder, after application and drying should have a Tg which is at or above the ambient or service temperature.

Known aqueous coating compositions, based on dispersion polymer binders, achieve this by using a hard binder polymer, in which the Tg of the said binder is above ambient, in combination with coalescing/plasticising solvents. The effect of the solvent is to reduce the Tg and MFFT of the binder polymer and hence the coating to below ambient. Once applied to the substrate, the final hardness of the solid coating increases to above ambient temperature by loss of the solvent and/or plasticiser. This occurs naturally as the coating dries or can be accelerated by increasing the temperature and/or raising the airflow.

Known solvent borne coatings can be formulated using binder polymers which are capable of autoxidation. This causes crosslinks to form between polymer chains when the liquid coating is exposed to air, in particular oxygen, which in turn increases the Tg and thus hardness of the dried coating after application.

Both of these methods suffer from the disadvantages that loss of the solvent and/or plasticiser during drying results in undesirable volatile organic compounds (VOC's) being emitted to the atmosphere. In addition, the transition from the low Tg during application, either through simple loss of carrier liquid or by autoxidation, to the higher Tg required of the final dried coating can take considerable time during which the paint on the coated surface remains tacky and cannot be touched or used.

The present challenge facing coating and paint formulators is one of formulating coatings and paints with low or no volatile components which also meet challenging performance criteria of ease of application, rapid drying and improved hardness.

Known aqueous paints contain one or more film-forming binder polymers. As a coating of liquid paint dries on a surface, this film-forming binder polymer serves to form a film (i.e. a dried coat) which bonds to the surface and also binds together all the non-volatile components of the paint including particularly any opacifiers, pigments and extenders present. A wide variety of conventional film-forming binder polymers are available, but those most commonly used in aqueous architectural paints are of three broad types obtained from mono-ethylenically unsaturated monomers and known colloquially as the "acrylics", the "vinyls" and the "styrenics". The "acrylics" are usually copolymers of at least two alkyl esters of one or more mono-ethylenically unsaturated carboxylic acids (e.g. methyl methacrylate-butyl acrylate copolymer) whilst the "vinyls" usually comprise copolymers of a mono-vinyl ester of a saturated carboxylic acid and at least one of either an acrylic monomer or a different mono-vinyl ester. The "styrenics" are copolymers containing styrene (or a similar mono-vinyl aromatic monomer) together with a copolymerisable monomer which is usually an acrylic.

Such solution or dispersion copolymers useful as film forming binder polymers, whether solvent borne or water borne can be made by well-known solution polymerisation or emulsion polymerisation methods respectively.

As mentioned above, the particles of binder polymer must preferably coalesce to form a substantially continuous film in order for the dried coating to have the necessary properties to protect the substrate. Coalescence can be improved by adding organic so-called "coalescing solvents" to the paint formulation and typical of such organic solvents are ethylene glycol, propylene glycol, benzyl alcohol and the proprietary solvent called "Texanol" which is trimethylpentane diol isobutyrate.

In order to produce coatings and paints that are less damaging to the environment the coating industry has developed the use of aqueous alkyd dispersions, which help in reducing the VOC emissions. The technology utilises low molecular weight alkyds which are dispersed, using surfactants, into water and although this technology is being increasingly used in decorative low emission coatings the time required for the coating to dry and harden is too long and the hardness of the coatings is poor.

Alkyd resins are made by condensation polymerization of dihydric or polyhydric alcohols, polybasic acids and a drying oil glyceride or acid. Typically, the drying-oil glyceride is converted to a monoglyceride, which is then reacted with an acid or acid anhydride to create an alkyd resin. When such resins are applied as coatings, the polymer backbones cross-link by autoxidation. The presence of trace amounts of certain metal salts, such as cobalt naphthenate, can be used as catalysts to speed up the autoxidation process.

European Patent Application 1044993 provides an aqueous dispersion which can be used in a water based coating composition which is free of volatile coalescing agents, and which can cure and harden by autoxidation under ambient conditions to form a continuous protective coating.

The aqueous dispersion of EP 1044993 includes a polymer which is a polymerization product of vinylic monomers, wherein from about 5% to about 90% by weight of the vinylic monomers are selected from co-esters of a drying oil acid and an unsaturated alpha, beta-polymerizable unsaturated carboxylic acid, and from about 0.5% to about 50% by weight, based on the weight of the copolymer, of a hydrophobic ester or partial ester of a drying oil acid and a polyol. 1 to 80% of the copolymer molecules have a molecular weight of 300-3000 and the copolymer dispersion has a gel content of less than 75%. However, the use of the drying oil coester can soften the coating and can also slow down the curing by autoxoidation as is shown by the Examples in EP 1044993 which demonstrate that the systems of EP 1044993 do not have the capability to produce hard films after application and drying even after extended periods of time.

EP 1044993 refers to U.S. Pat. No. 5,750,751 which describes copolymerization of vinylic monomers with glycol co-esters of drying oil acids and alpha, beta-unsaturated polymerizable carboxylic acids using aqueous emulsion polymerization. The glycol co-esters of drying oil acids and alpha, beta-unsaturated polymerizable carboxylic acids, which have both an acrylate functional group and drying oil functionalities, were said to be significantly more reactive than earlier alkyd resins. According to U.S. Pat. No. 5,750,751, the copolymers it describes did not exhibit any incompatibility problems, formed clear continuous films, and underwent autoxidative cure in the presence of drying catalysts. However, in order to obtain uniformly clear continuous films, the illustrated coating composition in U.S. Pat. No. 5,750,751 contained 10 weight percent on total emulsion or 18 weight percent on the resin non volatile content, of the volatile coalescing solvent, 2-butoxyethanol.

Accordingly there remains a need for coatings that combine good early and final hardness with low solvent emissions and for polymers that may be used in such coatings.

It is therefore an aim of the present invention to provide coating or paint compositions which may be applied from aqueous systems including systems free of organic solvents and/or coalescers to produce films of comparable hardness to solvent based systems and which have a reduced drying time when compared with existing aqueous systems. Although the invention provides useful coating systems free of organic solvents it is envisaged that formulators may wish to include solvents and or plasticisers for specific applications.

The present invention provides a coating composition comprising a copolymer dispersion capable of forming a film at or below ambient temperature and capable of curing to form a hard coating at or below ambient temperature and being handleable in less than 4 hours after application said composition containing less than 15% by weight of a volatile organic solvent and/or plasticiser.

In a preferred embodiment the invention provides an autoxidisable coating composition comprising a liquid dispersion medium and a binder wherein the binder comprises an unsaturated copolymer comprising i) at least one unsaturated fatty acid drying oil component and ii) one or more monomers copolymerisable with i) wherein at least 15% by weight of the binder is present as a microgel. More preferably the unsaturated copolymer comprises at least 15% by weight of microgel.

The preferred coating composition contains less than a total of 10%, more preferably less than 5% by weight of a volatile organic solvent and plasticiser, more preferably less than 3% by weight and is preferably free of both materials. The amount of solvent and/or plasticizer to be used may depend upon the Tg of the polymer itself, since the solvent and/or plasticizer has the effect of reducing the Tg and hence more may be required when using polymers of higher Tg. The presence of a solvent and/or plasticizer may be useful to improve the wetting of the substrate and/or the spreadability of the coating composition.

In a further embodiment the invention provides a dispersion of unsaturated copolymer comprising i) at least one unsaturated fatty acid drying oil component and ii) one or more monomers copolymerisable with i) wherein at least 15% by weight of the unsaturated polymer or copolymer is present as a microgel. Preferably, the copolymer is autoxidiseable. Even more preferably the copolymer is as defined in claims 17 to 28.

The term microgel means that the copolymer is insoluble in tetrahydrofuran at 25° C. when using 30 ml of tetrahydrofuran per 2 grams of the composition. These microgels may have such a high molecular weight that they will not pass through a Gel Permeation Chromatography column also the copolymers have a maximum calculated Fox Tg of 8° C., preferably a maximum calculated Fox Tg of 5° C. It is also preferred that the microgel & containing copolymers have a calculated Fox Tg no lower than −10° C. preferably no lower than −5° C. It is preferred that the composition of the present invention containing at least 25% microgel, preferably at least 45%, more preferably at least 55% and most preferably at least 75% and up to 95% of microgel. The microgels are formed by crosslinking during the polymerisation reaction used to produce the binder however, they retain sufficient residual unsaturation to enable further crosslinking by autoxidation after application of the coating.

Another beneficial aspect of the present invention is that the microgel particles of the dispersion can be particularly small as compared with the particle size of traditional binder polymers used in coatings. The mean particle size can be up to 1000 nanometers in diameter, preferably from 10 to 1000, more preferably from 20 to 750, even more preferably from 20 to 500, still more preferably from 20 to 250 and most preferably from 100 to 150 nanometers. Dispersions comprising particles below about 20 nanometers can appear transparent and are sometimes referred to as solutions. Particle size is measured using a Malvern Mastersize 2000.

We have found that the use of smaller particle size binders results in improved film formation perhaps due to increased interparticle interaction and also imparts improved gloss to the coatings perhaps due to the reduced tendency of the particles to scatter light.

Gel Content Method

About 2 grams of the latex were accurately weighed into a 33 ml plastic centrifuge tube that was then filled up with 30 ml tetrahydrofuran and capped. The latex was dissolved by shaking the mixture for half an hour at ambient in a shaker. Centrifugation for two hours at 35,000 g allows the gel to settle at the bottom of the tube. The clear liquid was then separated off from the solid/gel blend, which was then dried in the oven first at 500 C for 4 hours followed by another 1 hour at 110° C. and subsequently weighed.

The percentage of gel content in the non-volatile latex fraction is defined as follows:

(weight of gel/NVweight of sample)×100
(NV=non volatile)

We have found that the use of these copolymers as binders provides autoxidisable decorative coatings which air dry rapidly at room temperature and harden quickly to give hard, tough, durable, water resistant coatings requiring little if any volatile organic coalescing solvents or low molecular weight plasticisers and which give excellent wear resistance, even at high pigment to volume concentration, PVC and which improves with cure on storage. Preferred coating systems based on these copolymers contain less than 10% by weight of organic solvent preferably less than 5% by weight and most preferably 0%. Low levels are preferred as this minimises emissions and unpleasant smells, especially in enclosed spaces. The rapid hardening achieved with these coatings is thought to be due to the partial crosslinking that occurs within the polymer particles during polymerisation and crosslinking of the residual unsaturation in the copolymer by autoxidation after application and exposure to air. The rapid hardness development of the coating is thought to be due to the fact that some crosslinking has taken place prior to the application of the coating.

In a further preferred embodiment the unsaturated fatty acid drying oil component used in the production of the binder copolymer of the present invention contains an autoxidisable fatty acid moiety and may be the diester formed by reacting the unsaturated fatty acid with the oxirane group on an ethylenically unsaturated monomer such as glycidyl acrylate or methacrylate. Such a reaction produces a copolymerisable autoxidisable monomer of hydroxypropylene diester comprising unsaturated long chain fatty acid moiety linked to an unsaturated carboxylic acid ester by the divalent hydroxypropylene group. The unsaturation in the unsaturated carboxylic acid ester is then available for copolymerisation with the other monomers to form the backbone of the macromolecule whilst the unsaturation in the pendant long chain fatty acid derivatives renders the polymer molecule autoxidisable. Preferably the unsaturated fatty acid drying oil component is stored at low temperature to improve its storage stability.

The unsaturated long chain fatty acid is preferably a drying oil unsaturated acid such as the fats and oils used in the paint and coatings industry. The fats and oils normally used in the paints industry are of vegetable and animal origin. They consist in the main of mixed glycerol esters of long chain linear monocarboxylic acids called fatty acids and a number of minor non glyceride components.

In the paints industry oils are split into four different classes, namely—drying oils, semi-drying oils, non-drying oils and chemically modified oils. We prefer to use the drying oils such as linseed oil, tung oil, oiticia oil etc, although the semi-drying oils such as soya bean oil, sunflower seed oil, and tobacco seed oil can also be used. Commercially available "Tall Oil Fatty acid" is the preferred material and in particular the refined tall oil fatty acids containing less than 4% of rosin acids.

The properties of an oil depend largely on the type and proportion of the fatty acids making up the various triglycerides. The fatty acids which occur in natural oils (as glycerides) are either oily liquids or solids with low melting points. They are colourless when pure, and can be divided into "saturated" and unsaturated fatty acids. The more commonly occurring ones are listed below:

| Saturated | |
|---|---|
| Lauric acid | $CH_3(CH_2)_{10}COOH$ |
| Myristic acid | $CH_3(CH_2)_{12}COOH$ |
| Palmitic acid | $CH_3(CH_2)_{14}COOH$ |
| Stearic acid | $CH_3(CH_2)_{16}COOH$ |

| Unsaturated | |
|---|---|
| Oleic acid | $CH_3 \cdot (CH_2)_7 \cdot CH = CH \cdot (CH_2)_7 COOH$ |
| Linoleic acid | $CH_3 \cdot (CH_2)_4 \cdot CH = CH — CH_2 CH = CH \cdot (CH_2)_7 \cdot COOH$ |
| Linolenic acid | $CH_3 \cdot CH_2 \cdot CH = CH \cdot CH_2 \cdot CH = CH \cdot CH_2 \cdot CH = CH \cdot (CH_2)_7 \cdot COOH$ |
| Eleostearic acid | $CH_3 \cdot (CH_2)_3 \cdot CH = CH \cdot CH = CH \cdot CH = CH \cdot (CH_2)_7 \cdot COOH$ |
| Ricinoleic acid | $CH_3 \cdot (CH_2)_5 \cdot \underset{\underset{OH}{|}}{CH} \cdot CH_2 \cdot CH = CH \cdot (CH_2)_7 \cdot COOH$ |

To autoxidise or air dry, an oil preferably contains at least 40%, preferably 50% of a fatty acid containing two double bonds; better air drying properties are obtained with oils containing a high proportion of fatty acids containing three double bonds, particularly if they are conjugated. Therefore oils, such as coconut oil, consisting principally of saturated acids are non-drying; Soya bean oil, which consists principally of unsaturated acids linoleic acid (2 double bonds) is semi-drying; linseed oil, which consists largely of unsaturated linolenic acid (3 double bonds) has good air drying properties.

Oils such as linseed oil with a high content of unsaturated acids having 3 double bonds polymerise readily.

Preferred acids are the $C_{10}$-$C_{24}$ unsaturated drying or semi drying-oil acids such as oleostearoyl, linoleoyl, linolenoyl, oleoyl, arachidonoyl as single entities or in naturally occurring combinations that result form the processing of linseed oil, tung oil, soybean oil, menhaden oil, tall oil, dehydrated castor oil and the like. In the preferred systems of present invention the amount of drying oil acid that is reacted to produce the copolymerisable compound should be at least 5% and we prefer to use an amount between 10% and 40%.

Other milti-unsaturated monomers may be used as well as the unsaturated drying oil fatty acids. For example, allyl methacrylate or divinyl benzene may be used. However, they cannot replace the fatty acid completely as, although such monomers produce gelled particles, they are not capable of autoxidation.

A most preferred technique for introducing the autoxidisable moieties involves taking a copolymerisable compound, or monomer, containing a long chain unsaturated fatty acid moiety and copolymerising it with other monomers used in the production of the macromolecules. Preferably, the copolymerisable compound containing the fatty acid moiety should comprise from 5 to 50 wt % (and especially 10 to 40 wt %) of the monomers which are copolymerised to create the binder polymer.

We prefer that the unsaturated fatty acid drying oil component containing the long chain unsaturated fatty acid moiety is copolymerised with an acrylic monomer to form the binder used in the present invention. Examples of acrylic monomers which may be used to produce the polymers used in this invention include acrylic or methacrylic acid esters such as methyl methacrylate, ethylacrylate, ethylmethacrylate, propylacrylate, propylmethacrylate, butylacrylate, butylmethacrylate, 2-ethylhexylacrylate, 2-ethylhexylmethacrylate, decylacrylate, decylmethacrylate, hydroxyethylacrylate, hydroxyethylmethacrylate, hydroxypropylacrylate and hydroxypropylmethacrylate. Examples of other copolymerisable monomers that may be used include alkenes such as ethylene and propylene; and polymerizable carboxylic acids such as acrylic acid, methacrylic acid, itaconic acid, maleic acid and fumaric acid. Examples of other suitable copolymerisable monomers include vinyl monomers such as acrylonitrile; dienes such as 1,2-butadiene, 1,3-butadiene and chloroprene; 1,3,5-hexatriene; styrenic monomers such as styrene, alpha-methyl styrene, vinyl toluene; vinyl carboxylate esters such as vinyl acetate; vinyl versatate; vinyl halides such as vinyl chloride and vinylidene chloride; etc. Preferred vinylic monomers include acrylic acid, methacrylic acid, acrylic acid and methacrylic acid esters of aliphatic or aromatic alcohols, styrene, substituted styrenes, vinyl acetate and other vinyl carboxylate esters. Other monomers that may be used include α-olefins such as ethylene, propylene or butene-1 and styrene or its homologues. Copolymerised styrene and its homologues have the additional advantage of being particularly active in generating and coupling to free radicals and so they promote the autoxidation process which in turn accelerates the onset of water-resistance.

As a further embodiment of the present invention the autoxidisable copolymers of this invention are derived from and contain amide containing alpha, beta unsaturated monomers preferably up to 6% of these monomers. This has been found to further improve both the attainment of early hardness, for example at one day, and the film properties of the dispersions. Examples of such amide containing unsaturated monomers include acrylamide, methacrylamide and alkoxy acrylamides and methacrylamides such as a butoxyl methacrylamide. We prefer to use at least 2% by weight based on the total weight of unsaturated monomers, particularly from 4 to 6 wt % of such an unsaturated amide.

The copolymers of this invention are typically prepared by free radical emulsion polymerization preferably at low temperature with the monomers preferably pre-emulsified. A pre-emulsion of the monomers is preferably prepared in an aqueous solution containing surfactants and preferably a reducing agent, and a species that reversibly changes oxidation state. A chain transfer agent or regulator may be included in the pre-emulsion to control the gel content. Before introducing a free radical initiator into the system to initiate polymerization, the pre-emulsion is preferably homogenized, and oxygen is preferably displaced from the polymerization system with an inert gas.

The amount and type of surfactants used in preparing the copolymers of this invention are not believed to be particularly critical. Nevertheless, minimum amounts are preferably used in order to reduce any adverse effects on dried film properties, such as water resistance. Suitable surfactants include anionic, non-ionic, and combinations thereof. Examples of anionic surfactants include salts of fatty rosin and naphthenic acids, condensation products of naphthalene sulfonic acid and formaldehyde of low molecular weight, carboxylic polymers and copolymers of the appropriate hydrophile-lipophile balance, alkali or ammonium alkyl sulfates, alkyl sulfonic acids, alkyl phosphonic acids, fatty acids, oxyethylated alkyl phenol sulfates and phosphates. Examples of non-ionic emulsifiers include alkylphenol ethoxylates, polyoxyethylenated alkyl alcohols, amine polyglycol condensates, modified polyethoxy adducts, long chain carboxylic acid esters, modified terminated alkylaryl ether, and alkylpolyether alcohols. The amount of surfactant used is typically from about 0.1 to about 10% by weight based on the total weight of all monomers.

A redox initiation system is used in which the initiators are coupled with a suitable reducing agent and a compound that reversibly changes oxidation state. Examples of reducing agents include reducing sugars, sodium formaldehyde sulfoxylate, and various amines. Suitable compounds that reversibly change oxidation state include various metal ions and their complexes, such as complexed ferric and ferrous ions with ethylenediaminetetraacetetate (EDTA) being common examples. Another example of a suitable ferric complex which can reversibly change oxidation states is ferrocene. The reducing agents are typically employed at a level of from about 0.5 to about 10% by weight based on the total weight of all monomers. The species that reversibly changes oxidation state is typically present in an amount of from about 0.001 to about 1.5% by weight based on the total weight of all monomers. The use of higher amounts of initiator can result in lower conversion, we prefer to use from 0.15 to 0.5% fed with the charge to the reactor together with from 0.4 to 1%, preferably 0.5 to 0.7%, of the reducing agent.

Chain transfer agents or chain regulators can be employed in an amount of from about 0.001 to about 5.0% by weight based on the total weight of all monomers. A chain regulator or chain transfer agent is an agent that restricts molecular weight when present in a small amount during polymerisation in order to control the gel content. Typically chain transfer agents include alkyl thiols such as n-dodecyl thiol and t-octyl thiol. Certain halogen compounds are also useful, such as carbon tetrabromide. Chain transfer agents do not stop polymerization, they terminate one chain while starting a new growing chain. The overall or net effect is more polymer chains for a given amount of monomer, and, hence, a lower average molecular weight.

The preferred temperatures at which polymerization is performed depends on the monomers selected. However, the mini-emulsion polymerization is preferably carried out at temperatures below 80° C., typically from about 5° C. to about 45° C. typically to about 40° C., and more preferably from about 30° C. to about 45° C. and most preferably from about 30° C. to about 35° C. We have found that if higher temperatures are used conversion can be reduced due to breakage of the chains in the unsaturated fatty acid drying oil component. Furthermore, the polymer particles can tend to flocculate at higher temperatures and low temperature polymerisation is therefore preferred to retain small particle size.

A preferred process for the production of a dispersion of unsaturated copolymer of i) at least one unsaturated fatty acid drying oil component and ii) one or more monomers copolymerisable with i), the copolymer having a Tg of no more than 8° C. and a microgel content of at least 15 wt % wherein the particles preferably have a mean particle size in the range 20 to 750 nanometres, comprises copolymerising an unsaturated fatty acid drying oil component and the copolymerisable monomer in an emulsion employing a redox initiation system wherein the polymerisation is performed at a temperature in the range 30-45° C.

Mini-emulsion or micro-bulk polymerisation has been suggested as a way to reduce the amount of VOC's since it provides a finer emulsion of highly water-insoluble species such as monomers. Mini-emulsion polymerisation (see Schork et al, J. Appl. Polym. Sci., 60, 2069 (1996) and E. M. S. van Hamersveld et al., FATIPEC congr., 24, VOL D/247 (1998)) is thought to differ from conventional emulsion polymerization by proceeding in the monomer droplets of the emulsion. Diffusion of the vinylic monomers through the aqueous phase is not necessary. In mini-emulsion polymerisation, the monomers are pre-emulsified in water, in the presence of surfactants and a hydrophobic component, usually using high shear to form small uniform droplets. When an oil soluble initiator, in particular, is used, the small monomer droplets become the locus of polymerisation and form the polymer particles of the dispersion. It is thought that the hydrophobic component retains the more water-soluble monomers within the original particles which are the locus of the polymerisation. Schork et al. use a polymeric hydrophobe as an additive to a solution of the alkyd resin in vinylic monomers which are then dispersed in an aqueous solution of surfactants. Van Hamersveld et al. used essentially the same procedure, but with hexadecane as the hydrophobic additive.

Hydroxypropylene mixed diesters of unsaturated fatty acids and (meth)acrylic acids which are the reaction products of unsaturated long chain fatty acids and glycidyl (meth) acrylate esters are the preferred monomers because they are relatively easily available. However they suffer from the disadvantage of having a very low solubility in water which inhibits their activity in conventional aqueous copolymerisation processes unless environmentally unwelcome amounts of organic co-solvent are also present. It has been discovered that this can be solved by stirring the co-monomers (including the copolymerisable compound such as the diester) together with water, polymerisation initiator and surfactant and then subjecting the stirred mixture to intensive agitation sufficient to create a very large number of very small (less than 500 nm in diameter) droplets of mixture of co-monomers. The polymerisation initiator may be water soluble or oil soluble; that is to say soluble in the monomers. When an oil soluble initiator, such as lauryl peroxide is used, it is preferred that it is first dissolved in the monomers and subjected to the intensive agitation prior to causing the polymerisation to proceed. When a water soluble polymerisation initiator is used, such as for example ammonium persulphate, it may be added either before or after intensive agitation. When such a water soluble initiator is used, copolymerisation is initiated in the water phase but then the copolymerising system will migrate into organic zones created by the droplets where copolymerisation will continue. The migration will be quick because it is favoured by the high surface area provided by the very large number of very small droplets of co-monomer. This migration permits effective copolymerisation of very low water-solubility monomers, in this case the autoxideable copolymerisable compounds.

The preferred mixed diester comprises methacrylate moieties and moieties derived from drying and semi-drying oil fatty acids and the most preferred from tall oil fatty acid. Polymerisation can be effected by raising the temperature. Preferably temperatures of 30 to 80° C. more preferably 30-45° C. are used. Additionally and alternatively, a redox initiator system may be used. Suitable examples of such systems include hydrogen peroxide and ascorbic acid, ammonium persulphate and sodium metabisulphite or sodium sulphoxylate formaldehyde. Optionally metal salts such as copper or iron salts may be added.

The required intensive agitation may be provided by mechanical emulsifiers such as a Ross 100 (available from Ross and Son, Hauppauge, N.Y., USA) or a Silverson (available from Silverson machines Ltd, Chesham, Buckinghamshire, UK) or an IKA emulsifier (available from IKA-Works Inc, Cincinnati, Ohio, USA). Alternatively, a Sonolator (available from Sonic Corp, Stratford, Conn., USA) may be used which employs ultrasound to generate the required shear. Preferably, agitation is sufficiently energetic to produce eventual particles of miniemulsion which have a number average particle size of below 500 nm and preferably below 300 nm.

The coating systems of the present invention can be employed in various aqueous paints, coatings, inks, adhesives and sealants, and in particular in water-based systems that are free of organic solvents or coalescents. The coatings may be clear coatings or in the case of paints they will contain pigments, optionally extender pigments, dispersing agents for the pigments and perhaps viscosity modifiers and flow aids. A drying catalyst is preferably added to the aqueous dispersion to accelerate the autoxidative cross-linking and hardening of the coating. The drying catalysts (also known as dryers or siccatives) are generally organometallic compounds, typically transition metal soaps such as cobalt napthenate. Other examples include manganese, lead and zirconium soaps. The cobalt, manganese, lead and zirconium soaps are sometimes used in combination with other metal soaps, such as calcium or potassium soaps, which in themselves are not dryers.

We have found that the high gel containing autoxidative dispersions of the present invention show very much improved early cure than conventional water dispersible alkyds. Furthermore, we have found that this may be achieved when catalysed with very low levels of Vanadium driers. We have found that when using the systems of the present invention harder coatings may be obtained using surprisingly low amounts, below 1% typically 0.2% to 0.6 wt % based on the weight of non volatile materials in the coating of Vanadium driers. This is opposite to the behaviour observed with waterborne alkyds where the use of Cobalt is necessitated to obtain acceptable cure with time. Thus compositions based on our novel dispersions can be cured with low levels or even without use of Cobalt driers which is a further embodiment of the present invention. The coatings obtained from the systems of the present invention are harder than coatings obtained from previous aqueous coating systems.

Fillers, extenders, pigments and other additives known in the art may also be used in the compositions of this invention, if desired.

We have found that in order to produce autoxidisable materials that can be applied as aqueous systems and which will dry and harden rapidly to produce desirable coatings the polymeric binder should be precrosslinked in the form of a microgel, should have a calculated Fox glass transition temperature Tg below 8° C. preferably below 5° C. and should contain residual unsaturation. For the purpose of these Tg calculations, the Tg of hydroxypropylene mixed diesters of tall oil fatty acid and glycidyl methacrylate has been assumed to be that of stearyl methacrylate which is (−50° C.) since it is not possible to homopolymerise without crosslinking to determine its experimentally derived Tg. The resins used in the coating compositions of the present invention therefore contain a high proportion of drying oil acid or its derivatives and are themselves highly unsaturated. The resins are however already crosslinked to a degree to produce the microgel. We have found that this combination ensures that coatings derived from these resins are quick drying to form hard coatings through autoxidation. We have also found that these resins can be used in aqueous coating compositions which may be totally free of organic solvents or dispersants or may be used in coating compositions employing a significantly reduced amount of organic solvents or dispersants. Accordingly the present invention allows the production of coatings which are as hard as, or often harder than coatings obtained from conventional alkyd resins or film forming non crosslinking acrylic resins and which dry and are handleable in less than 4 hours, sometimes less than 3 hours and which can be applied from aqueous systems.

We have found that the dispersions of the present invention, are compatible with a wide range of other aqueous polymer dispersions which include alkyd dispersions, acrylic dispersions and poly-urethane acrylic hybrid dispersions. We have found that this use of the compositions of the present invention enhances the film forming properties in particular they improve the speed of hardening of the coatings and we prefer to use from 20% to 80% by weight of the total composition of the compositions of the present invention.

The present invention is illustrated by reference to the following Examples in which the polymeric binders were prepared as follows.

Process for the Production of GMA/TOFA Adduct, an Unsaturated Fatty Acid Drying Oil Component.

500.0 g of tall oil fatty acid (TOFA), 11.1 g of tetraethyl ammonium bromide and 0.86 g of hydroquinone were charged under nitrogen to a one litre round bottom flask fitted with a reflux condenser and a stirrer. The contents of the flask were stirred and heated to 80° C. and then 355.0 g of glycidyl methacrylate were added gradually over a period of 2 hours whilst at a temperature of 80° C. and stirring were maintained for a further 1.5 hours.

During the process, TOFA reacted with oxirane moieties in the glycidyl methacrylate to form a copolymerisable diester in which unsaturated methacrylate moieties were linked to an autoxidisable TOFA carboxylate by a hydroxypropylene divalent group. The reaction was catalysed by the tetraethyl ammonium bromide and premature polymerisation was inhibited by the hydroquinone. The resulting copolymerisable compound was a copolymerisable autoxidisable monomer and was stored at 4° C. until used. A molar excess of the glycidyl methacrylate over the TOFA was used.

The dispersions were prepared according to the formulation recipe (Table 1) and miniemulsion method described below. Adducts with lower or equivalent molar excess can also be used and give similar performance in coatings.

TABLE 1

| | Example | | | | | | | | | | |
|---|---|---|---|---|---|---|---|---|---|---|---|
| | 1 | 2 | 2a | 2b | 3 | 3a | 4 | 5 | 6 | 7 | 8 |
| MONOMER EMULSION | | | | | | | | | | | |
| Borax Granular | 0.75 | 2.3 | 2.24 | 0.75 | 0.75 | 0.75 | 0.75 | 2.24 | 0.75 | 0.75 | 0.74 |
| Water | 596.19 | 585.8 | 595.60 | 593.32 | 596.19 | 596.16 | 596.19 | 595.6 | 596.19 | 596.19 | 593.43 |
| Disponil A1580 | 25.43 | 25.6 | 25.41 | 25.41 | 25.43 | 25.43 | 25.43 | 25.41 | 25.43 | 25.43 | 25.32 |
| Disponil A4066 | 36.13 | 36.3 | 36.09 | 36.09 | 36.13 | 36.13 | 36.13 | 36.09 | 36.13 | 36.13 | 35.96 |
| Styrene | 312.64 | 314.4 | 104.11 | 104.11 | 104.21 | 104.21 | 104.21 | 312.22 | 104.21 | 104.21 | 103.73 |
| Methyl Methacrylate | 6.60 | 6.6 | 211.55 | 211.55 | 212.38 | 275.35 | 238.71 | 33.45 | 202.66 | 184.59 | 237.62 |
| 2-Ethyl Hexyl acrylate | 97.61 | 98.2 | 100.78 | 100.78 | 72.47 | 176.30 | 212.88 | 209.47 | 221.14 | 225.30 | 211.89 |
| Methacrylamide | 0.00 | 0.0 | 0.00 | 0.00 | 27.79 | 0.00 | 0.00 | 0 | 27.79 | 41.69 | 0.00 |
| GMA/TOFA adduct | 277.90 | 279.5 | 277.63 | 277.63 | 277.90 | 138.94 | 138.95 | 138.81 | 138.95 | 138.95 | 138.30 |
| n Octyl Mercaptan | | | | | | | | | | | 6.93 |
| A-SEED OXIDANT SHOT | | | | | | | | | | | |
| Water | 2.64 | 2.7 | 2.64 | 2.64 | 2.64 | 2.64 | 2.64 | 2.64 | 2.64 | 2.64 | 2.63 |
| t-Butyl Hydro peroxide | 0.55 | 0.6 | 0.55 | 0.55 | 0.55 | 0.55 | 0.55 | 0.55 | 0.55 | 0.55 | 0.56 |
| B-PREFEED OXIDANT SHOT | | | | | | | | | | | |
| Water | 29.06 | 29.2 | 29.03 | 29.03 | 29.06 | 29.06 | 29.06 | 29.03 | 29.06 | 29.06 | 28.92 |
| Ammonium Persulphate | 2.94 | 4.5 | 2.94 | 4.47 | 2.94 | 2.94 | 2.94 | 2.94 | 2.94 | 2.94 | 2.93 |
| C-SOLUTION (REDUCTANT) | | | | | | | | | | | |
| Water | 66.27 | 66.6 | 66.21 | 66.21 | 66.27 | 66.27 | 66.27 | 66.21 | 66.27 | 66.27 | 65.97 |
| Sodium Metabisulphite | 4.47 | 6.8 | 4.47 | 6.71 | 4.48 | 4.47 | 4.48 | 4.47 | 4.48 | 4.48 | 4.46 |
| D-MOP UP OXIDANT SHOT | | | | | | | | | | | |
| Water | 11.63 | 11.7 | 11.62 | 11.62 | 11.64 | 11.63 | 11.64 | 11.62 | 11.64 | 11.64 | 11.58 |
| t-Butyl Hydro peroxide | 2.36 | 2.4 | 2.35 | 2.35 | 2.36 | 2.36 | 2.36 | 2.35 | 2.36 | 2.36 | 2.34 |

TABLE 1-continued

| | Example | | | | | | | | | | |
|---|---|---|---|---|---|---|---|---|---|---|---|
| | 1 | 2 | 2a | 2b | 3 | 3a | 4 | 5 | 6 | 7 | 8 |
| E-MOP UP REDUCTANT FEED | | | | | | | | | | | |
| Water | 14.53 | 14.6 | 14.51 | 14.51 | 14.53 | 14.53 | 14.53 | 14.51 | 14.53 | 14.53 | 14.46 |
| t-Butyl Hydro peroxide | 3.19 | 3.2 | 3.19 | 3.19 | 3.19 | 3.19 | 3.19 | 3.19 | 3.19 | 3.19 | 3.18 |
| SPIKE 1 | | | | | | | | | | | |
| t-Butyl perbenzoate | 0.79 | 0.8 | 0.79 | 0.79 | 0.79 | 0.79 | 0.79 | 0.79 | 0.79 | 0.79 | 0.78 |
| 10% sodium Ascorbate in water | 3.76 | 3.8 | 3.76 | 3.76 | 3.76 | 3.76 | 3.76 | 3.76 | 3.76 | 3.76 | 3.74 |
| SPIKE 2 | | | | | | | | | | | |
| t-Butyl perbenzoate | 0.79 | 0.8 | 0.79 | 0.79 | 0.79 | 0.79 | 0.79 | 0.79 | 0.79 | 0.79 | 0.78 |
| 10% sodium Ascorbate in water | 3.76 | 3.8 | 3.76 | 3.76 | 3.76 | 3.76 | 3.76 | 3.76 | 3.76 | 3.76 | 3.74 |
| Polymerisation Temperature ° C. | 30 | 30 | 40 | 40 | 30 | 40 | 30 | 40 | 30 | 30 | 30 |
| Conversion % | 97.3 | 96 | 98 | 93 | — | 96 | 98 | — | — | — | — |
| Average particle size Nm | 115 | 115 | 127 | 135 | — | 125 | 114 | — | — | — | — |

Disponil A1580 and A4066 are Surfactants Available from the Henkel Corporation

Method of Preparation
1. Pre-emulsify the monomer charge at 10-15° C. in a Silverson.
2. Charge 20% of monomer emulsion, raise to 30° C. under Nitrogen blanket and slow stir for 10 mins.
3. Add solution (A) and hold for 10 mins.
4. Add 23.6% of (C) and allow to exotherm. Hold the temp at 30° C.
5. Add 11.7% of (C) and hold for 20 mins whilst holding at 30° C.
6. Take a Sample (SI). Check particle size, pH and solids.
7. Add (D) then feed remainder of (C) solution and monomer emulsion (80%) over 3 hours.
8. At end of feed hold for 10 mins.
9. Add (D).
10. Start feed (E) over 30 mins.
11. Hold for 10 mins then add spike 1.
12. Hold for 30 mins then add spike 2.
13. Hold for 30 mins then sample and check conversion. Add extra spikes if necessary. Cool and filter the final product.

A drier was added to the products of Table 1, when a Cobalt drier was used −10 g of latex was mixed with 0.125 g of Cobalt drier and mixed thoroughly (2.5% on solids); when Vanadium driers were used −10 g latex was mixed with 0.02 g of vanadium driers (0.4% on solids) 100 micron films of these formulations were then cast on a glass plate and allowed to dry.

The hardness was measured after 1 day and 60 days using an Erichson Pendulum Hardness tester.

The results are set out in Table 2

TABLE 2

| | Example Number | | | | | | | | |
|---|---|---|---|---|---|---|---|---|---|
| | 9 | 10 | 11 | 12 | 13 | 14 | 15 | 16 | 17 |
| Miniemulsion Number | 1 | 2 | 3 | 4 | 5 | 6 | 7 | 8 | *** |
| % Methacrylamide | 0 | 0 | 4 | 0 | 0 | 4 | 6 | 0 | |
| % GMA/FA adduct | 40 | 40 | 40 | 20 | 20 | 20 | 20 | 20 | |
| Gel | 76.1 | 80.4 | 78 | 85.5 | 76.7 | 80 | 81 | 0 | 0 |
| Tg | −4 | −4 | 5 | −4 | −4 | −4 | −4 | −4 | |
| Erichson Hardness 1 d* | 51 | 55 | 60 | 26 | 23 | 39 | 31 | 19 | 23 |
| Erichson Hardness 60 d* | 153 | 147 | 140 | 85 | 70 | 55 | 50 | 64 | 71 |
| Erichson Hardness 1 d** | 69 | 74 | | 29 | 29 | | | | 12 |
| Erichson Hardness 60 d** | 172 | 172 | | 101 | 114 | | | | 76 |

*2.5% Cobalt drier (Combi LS from Condea Servo BV) in samples 9-16 and 2% in sample 17
**0.4% Vanadium drier (VP0132 from Borchers G) in all sample
***commercial alkyd emulsion (Uradil AZ554-Z50 from DSM Example 16 demonstrates that low gel content lowers the early hardness of the coatings. Examples 11, 14, and 15 demonstrate that higher values of hardness are achieved when methacrylamide is employed as a co-monomer.

Example 17 shows that early hardness is not developed with commercial alkyd dispersions when used with vanadium driers while examples 9, 10, 12 and 13 demonstrate excellent hardness observed in our coatings using low levels of vanadium driers.

EXAMPLES 18-20

Paints were prepared from the binders produced according to Example 1-8 employing the following paint formulation. The millbase was first prepared by dispersing in a high speed paint disperser and then the other ingredients listed in the paint make up were added to finish making of the paint.

| Ingredients | Formulation |
|---|---|
| Millbase | |
| Water | 10.2 |
| Rocima V189 (a biocide from Rohm and Haas, UK) | 0.1 |
| Disperlair CF246 (a defoamer from Blackburn Chemicals, UK) | 0.1 |
| Disperbyk 190 (a pigment dispersant from Byk Chemie) | 1.0 |

The paints were applied using a 200 micron block spreader and allowed to become touch dry and the second coat was applied.

Finger tackiness and marking resistance was tested at regular intervals on both single coats and double coats.

For marking resistance measurement, a hard 1 cm×1 cm square plastic textured matt was stuck to a 10 kg iron weight. This weight was applied on the surface of the drying paint film with the textured matt surface face down for a period of 5 seconds. The mark was observed after the paint film had dried fully.

In the case of the paints of the invention, the marks disappeared within several minutes after the removal of the weight. However, the marks remained in the paint layers produced from the comparative waterborne alkyd emulsion.

The results are set out in Table 3

TABLE 3

| paint | Time (hours) | Tack first coat | mark first coat | tack second coat | mark second coat |
|---|---|---|---|---|---|
| Ex 18 made from Ex 4 | ½ | slightly tacky | very faint mark | slightly tacky | faint mark |
| | 1 | slightly tacky | very faint mark | slightly tacky | very faint mark |
| | 2 | very slightly tacky | very faint mark | slightly tacky | no mark |
| | 3 | very very slightly tacky | no mark | slightly tacky | no mark |
| | 4 | non tacky | no mark | non tacky | no mark |
| | 24 | non tacky | no mark | non tacky | no mark |
| Ex 19 made from Example 2 | ½ | Slightly tacky-tacky | faint mark-mark | slightly tacky-tacky | faint mark-mark |
| | 1 | Slightly tacky-tacky | faint mark | slightly tacky-tacky | faint mark-mark |
| | 2 | slightly tacky | faint mark | slightly tacky | faint mark |
| | 3 | slightly tacky | very faint mark | slightly tacky | no mark |
| | 4 | very slightly tacky | no mark | slightly tacky | no mark |
| | 24 | non tacky | no mark | non tacky | no mark |
| Ex 20 made from Example 6 | ½ | Slightly tacky-tacky | very faint mark | slightly tacky-tacky | faint mark |
| | 1 | slightly tacky | no mark | slightly tacky | very very faint mark |
| | 2 | very slightly tacky | no mark | very slightly tacky | no mark |
| | 3 | non tacky | no mark | very very slightly tacky | no mark |
| | 4 | non tacky | no mark | non tacky | no mark |
| | 24 | non tacky | no mark | non tacky | no mark |
| Ex 21 Commercial paint based on Alkyd Emulsion | ½ | very tacky | very very bad mark | very tacky | very very bad mark |
| | 1 | Tacky | very bad mark | very tacky-tacky | very bad mark |
| | 2 | Tacky | mark | tacky-slightly tacky | bad mark |
| | 3 | slightly tacky | mark | slightly tacky | mark |
| | 4 | non tacky | faint mark | non tacky | mark |
| | 24 | non tacky | no mark | non tacky | very faint mark |

| Ingredients | Formulation |
|---|---|
| -continued | |
| Rhodoline DF 6681 (a defoamer from Rhodia) | 0.1 |
| Acrysol RM 2020 (a thickener from Rohm and Haas, UK) | 1.3 |
| Tiona 595 (a white inorganic pigment from Millenium Inorganic Chemicals) | 24.5 |
| Acrysol RM8 (a thickener from Rohm and Haas, UK) | 0.9 |
| Borchigel VP9628 (a structuring agent from Borchers, France) | 0.5 |
| Paint make up | |
| water | 1.4 |
| water | 3.0 |
| water | 3.2 |
| miniemulsion latex as a binder | 52.8 |
| Empimin OT 75 (a surfactant from Albright Wilson, UK) | 0.5 |
| Combi LS (a cobalt dryer from Condea Servo, BV) | 0.60 |
| Total | 100.2 |

The paints had a PVC of 20%, a solids content of 51.5% by weight and a volume nv % of 38.65%; volume nv % is the total volume of the non volatile part of the coating expressed as a percentage of the total volume of the coating.

It is clear from the data that paints from the examples of the invention containing no solvents or coalescents can cure very fast to give films which are handleable and mark resistant much faster than conventional waterborne alkyd paints Another surprising finding is that styrene containing compositions demonstrate good film forming ability with increased cure rate in our systems as exemplified below in Tables 4 and 5.

TABLE 4

| | Example | | |
|---|---|---|---|
| | ex 22 | ex 23 | ex 24 |
| MONOMER EMULSION | | | |
| Borax Granular | 1.483 | 1.5 | 1.48 |
| Water | 603.23 | 600.3 | 600.29 |
| Disponil A1580 | 25.70 | 25.6 | 25.57 |
| Disponil A4066 | 36.51 | 36.3 | 36.33 |
| Styrene | 0.00 | 124.2 | 186.31 |
| Methyl Methacrylate | 367.11 | 248.4 | 186.31 |
| 2-Ethyl Hexyl methacrylate | 116.43 | 115.9 | 115.87 |

TABLE 4-continued

|  | Example | | |
| --- | --- | --- | --- |
|  | ex 22 | ex 23 | ex 24 |
| Methacrylamide | 0.00 | 0.0 | 0.00 |
| GMA/TOFA adduct | 210.43 | 209.4 | 209.40 |
| A-SEED OXIDANT SHOT | | | |
| Water | 2.67 | 2.7 | 2.66 |
| t-Butyl Hydro peroxide | 0.56 | 0.6 | 0.56 |
| B-PREFEED OXIDANT SHOT | | | |
| Water | 29.37 | 29.2 | 29.23 |
| Ammonium Persulphate | 2.97 | 3.0 | 2.95 |
| C-SOLUTION (REDUCTANT) | | | |
| Water | 66.98 | 66.7 | 66.65 |
| Sodium Metabisulphite | 4.52 | 4.5 | 4.50 |
| D-MOP UP OXIDANT SHOT | | | |
| Water | 11.76 | 11.7 | 11.71 |
| t-Butyl Hydro peroxide | 2.38 | 2.4 | 2.37 |
| E-MOP UP REDUCTANT FEED | | | |
| Water | 14.68 | 14.6 | 14.61 |
| t-Butyl Hydro peroxide | 3.23 | 3.2 | 3.22 |
| SPIKE 1 | | | |
| t-Butyl perbenzoate | 0.8 | 0.8 | 0.79 |
| 10% sodium Ascorbate in water | 3.8 | 3.8 | 3.76 |
| SPIKE 2 | | | |
| t-Butyl perbenzoate | 0.8 | 0.8 | 0.79 |
| 10% sodium Ascorbate in water | 3.8 | 3.8 | 3.76 |
| TOTAL | 1509.15 | 1509.16 | 1509.10 |

The above miniemulsions were made exactly as described for miniemulsions 1-8 in Table 1 except that the temperature of polymerisation was kept at 60° C.

The above latices were then made into clearcoats with addition of Cobalt drier as in examples 9-16 and applied on glass plates. The hardness coatings measured after 1 day, 7 days and 30 days. The results are given in Table 5.

TABLE 5

|  | Example Number | | |
| --- | --- | --- | --- |
|  | 22 | 23 | 24 |
| % Styrene of all monomers | 0 | 18 | 26 |
| Fox Tg | 5 | 5 | 5 |
| % GMA/TOFA | 30 | 30 | 30 |
| drier | cobalt | cobalt | cobalt |
| Gel content | 80 | 87 | 85.2 |
| Erichson Hardness 1 d | 64 | 53 | 48 |
| Erichson Hardness 7 d | 104 | 121 | 140 |
| Erichson Hardness 30 d | 120 | 140 | 151 |

The data show that as the styrene content is increased, the hardness development or cure rate is increased as well as the final hardness.

The invention claimed is:

1. An autoxidisable coating composition comprising a liquid dispersion medium and a binder wherein the binder comprises an unsaturated copolymer which is produced by i) reacting at least one unsaturated fatty acid drying oil component and an ethylenically unsaturated monomer, wherein the unsaturated fatty acid reacts with an oxirane group on said ethylenically unsaturated monomer to yield a first reaction product and ii) subsequently reacting said first reaction product with one or more monomers copolymerisable with the product of said first reaction and selected from the group consisting of acrylic acid esters, methacrylic acid esters, acrylic acid, methacrylic acid, acrylic acid esters of aliphatic alcohols, acrylic acid esters or aromatic alcohols, methacrylic acid esters of aliphatic alcohols, methacrylic acid esters of aromatic alcohols, styrene, substituted styrenes, vinyl carboxylate esters, and vinyl carboxylate olefins selected from ethylene, propylene or butene-1 and styrene or its homologues and wherein at least 15% by weight of the binder is present as microgel, which is the result of the two reaction steps and which is insoluble in tetrahydrofuran.

2. A coating according to claim 1 in which the copolymer has a maximum calculated FOX Tg of 8 C.

3. A coating composition according to claim 1 comprising an aqueous dispersion.

4. A coating according to claim 1 wherein the Microgel has particles of the copolymer of a size between 20 and 750 nanometers.

5. A coating composition according to claim 1 in which the ethylenically unsaturated monomer is glycidyl acrylate or methacrylate.

6. A coating composition according to claim 1 in which the unsaturated fatty acid contains at least 40% of an unsaturated fatty acid drying oil containing at least two double bonds.

7. A coating composition according to claim 1 in which the copolymer is derived from and contains one or more copolymerized amide containing alpha, beta unsaturated monomers.

8. A coating composition according to claim 1 comprising a water-based paint.

9. A coating composition according to claim 1 comprising an ink.

10. A coating composition according to claim 1 containing a Vanadium containing compound as a drying catalyst.

11. A coating wherever produced from a coating composition according to claim 1.

12. A dispersion of unsaturated copolymer particles, the copolymer which is produced by i) reacting at least one unsaturated fatty acid drying oil component and an ethylenically unsaturated monomer, wherein the unsaturated fatty acid reacts with an oxirane group on said ethylenically unsaturated monomer to yield a first reaction product and ii) subsequently reacting said first reaction product with one or more monomers copolymerisable with the product of said first reaction and selected from the group consisting of acrylic acid esters, methacrylic acid esters, acrylic acid, methacrylic acid, acrylic acid esters of aliphatic alcohols, acrylic acid esters or aromatic alcohols, methacrylic acid esters of aliphatic alcohols, methacrylic acid esters of aromatic alcohols, styrene, substituted styrenes, vinyl carboxylate esters, and vinyl carboxylate olefins selected from ethylene, propylene or butene-1 and styrene or its homologues and wherein at least 15% by weight of the binder is present as microgel, which is the result of the two reaction steps and which is insoluble in tetrahydrofuran.

13. A copolymer according to claim 12 having a maximum Fox Tg of 8 C.

14. A copolymer according to claim 12 in which the particles of the copolymer are of a size between 20 and 750 nanometers.

15. A copolymer according to claim 12 in which the ethylenically unsaturated monomer is glycidyl acrylate or methacrylate.

16. A copolymer according to claim 12 in which the drying oil fatty acid is tall oil fatty acid.

17. A copolymer according to claim 12 containing one or more amide containing alpha, beta unsaturated monomers.

18. A copolymer according to claim 17 having a maximum Fox Tg of 8 C.

19. A copolymer according to claim 12 further containing styrene and/or its homologues.

20. A copolymer dispersion according to claim 12 wherein said dispersion is aqueous.

21. A process for the production of a dispersion of unsaturated copolymer according to claim 12 comprising copolymerizing said at least one unsaturated fatty acid drying oil component and said one or more copolymerisable monomers in an emulsion employing a redox initiation system wherein the polymerization is performed at a temperature in the range of 30-45 C.

22. A process according to claim 21 wherein from 0.15% to 0.50% by weight of the redox initiation system based on the weight of monomers is employed.

23. A autoxidisable coating composition, comprising: A) a liquid dispersion medium; B) a binder wherein the binder comprises an unsaturated copolymer which is produced by i) reacting at least one unsaturated fatty acid drying oil component is formed by reacting (a) the unsaturated fatty acid which has at least 50% of an unsaturated fatty acid by drying oil containing at least two double bonds with (b) an oxirane group on an ethylenically unsaturated monomer selected from glycidyl acrylate or methacrylate to yield a first reaction product and ii) subsequently reacting the product from the first reaction with one or more acrylic monomers selected from acrylic or methacrylic acid esters acrylic acid, methacrylic acid esters, acrylic acid, methacrylic acid, acrylic acid esters of aliphatic alcohols, acrylic acid esters or aromatic alcohols, methacrylic acid esters of aliphatic alcohols, methacrylic acid esters of aromatic alcohols, styrene, substituted styrenes, vinyl carboxylate esters, and vinyl carboxylate olefins selected from ethylene, propylene or butene-1 and styrene or its homologues and wherein at least 15% by weight of the binder, which is the result of the two reaction steps, is present as a microgel which is the result of the two reaction steps and which is insoluble in tetrahydrofuran and wherein optionally the copolymer is derived from and contains one or more copolymerized amide containing alpha, beta unsaturated monomers, and C) optionally a Vanadium containing compound as a drying catalyst.

24. A coating produced from a coating composition according to claim 23.

* * * * *